US012660832B2

(12) United States Patent
Lu et al.

(10) Patent No.: US 12,660,832 B2
(45) Date of Patent: Jun. 23, 2026

(54) EQUIPMENT AND METHOD FOR OZONE CIRCULATION FUMIGATION IN GRAIN DEPOT

(71) Applicant: Zhejiang A&F University, Hangzhou (CN)

(72) Inventors: Xinghua Lu, Hangzhou (CN); Kun Fang, Hangzhou (CN); Linjiang Pang, Hangzhou (CN); Yuge Guan, Hangzhou (CN); Mingyi Yang, Hangzhou (CN); Bo Yu, Hangzhou (CN); Zhenyu Shao, Hangzhou (CN)

( * ) Notice: Subject to any disclaimer, the term of this patent is extended or adjusted under 35 U.S.C. 154(b) by 132 days.

(21) Appl. No.: 18/820,287

(22) Filed: Aug. 30, 2024

(65) Prior Publication Data

US 2025/0366485 A1      Dec. 4, 2025

(30) Foreign Application Priority Data

May 29, 2024      (CN) .......................... 202410683710.2

(51) Int. Cl.
*A23B 9/18*      (2006.01)
(52) U.S. Cl.
CPC ...................................... *A23B 9/18* (2013.01)
(58) Field of Classification Search
CPC ...................................................... A23B 9/18
See application file for complete search history.

(56) References Cited

FOREIGN PATENT DOCUMENTS

| CN | 101011081 A | * | 8/2007 |
| CN | 107258247 A | | 10/2017 |
| CN | 108244085 A | | 7/2018 |
| CN | 216315073 U | | 4/2022 |

OTHER PUBLICATIONS

English translation of CN-101011081-A (Year: 2007).*
CNIPA First Office Action, Application No. 202410683710.2, Dated Mar. 12, 2025, English Translation, pp. 1-7.
CNIPA First Office Action, Application No. 202410683710.2, Dated Mar. 12, 2025, Original Chinese, pp. 1-6.

* cited by examiner

*Primary Examiner* — Sean E Conley

(57) ABSTRACT

An equipment and a method for ozone circulation fumigation in grain depot are provided. The equipment includes a grain storage cavity, an air intake unit, a circulation unit, and a fixed unit. The air intake unit is connected to the grain depot through a fixed unit, the circulation unit is located on the side of the grain depot away from the air intake unit, the circulation unit is connected to the air intake unit through a reflux pipe, the reflux pipe is equipped with an ozone concentration sensor, the transverse diffusion tube of the air intake unit is connected to the grain storage cavity, the grain storage cavity is equipped with a ventilation partition, there are several air vents on the ventilation partition, and a backflow channel is formed between the ventilation partition and the side wall of the grain depot.

5 Claims, 4 Drawing Sheets

EQUIPMENT AND METHOD FOR OZONE CIRCULATION FUMIGATION IN GRAIN DEPOT

CROSS REFERENCE TO THE RELATED APPLICATIONS

This application is based upon and claims priority to Chinese Patent Application No. 202410683710.2, filed on May 29, 2024, the entire contents of which are incorporated herein by reference.

TECHNICAL FIELD

The invention relates to the field of insecticidal steriliza-tion technology for grain depot, in particular to an equip-ment and a method for ozone circulation fumigation in grain depot.

BACKGROUND

Grain is often damaged by molds, pests and other micro-organisms during storage, resulting in quality degradation and even waste. Traditional control methods use chemical fumigants, such as phosphine, dichlorvos, and bromometh-ane, to kill pests in the form of insecticides. However, long-term practice shows that the bactericidal effect of these methods will gradually weaken, and it will also bring about environmental pollution and food chemical residues. In recent years, people have gradually turned to nitrogen gas and ozone circulation fumigation methods, which have the advantages of environmental protection and no chemical residue, and have shown good results in insecticidal and bactericidal aspects. However, nitrogen gas storage needs to maintain a high concentration of nitrogen and pressure for a long time, which is time-consuming and laborious to oper-ate, ozone circulation fumigation only needs to maintain a certain ozone concentration for a period to complete insec-ticidal sterilization.

In the existing technology, the patent CN107258247A maintains the concentration and pressure of nitrogen in the grain depot by supplying nitrogen on one side and recycling nitrogen on the other side, the invention can well store grain in nitrogen atmosphere, but it cannot be well applied to the circulation fumigation of ozone gas source, nitrogen gas-regulated grain storage is essentially to replace oxygen with nitrogen, reduce the chemical reaction between oxygen and water and microorganism in grain, and inhibit the growth and reproduction of pests. Therefore, it is only necessary to maintain the nitrogen concentration and pressure in the grain depot within a certain range to achieve the effect of insec-ticidal sterilization. However, the main gas pipe in the patent has only one nitrogen inlet, and the main gas pipe is long and has several vertical air ducts, which will cause the pressure of the vertical air duct near the nitrogen inlet to be large, and the pressure of the vertical air duct far away from the nitrogen inlet to be small, resulting in a large flow of nitrogen in the grain layer corresponding to the vertical air duct at a high pressure, and it is opposite at a low pressure, if the air conditioning method is used for ozone circulation fumigation, it will lead to excessive oxidation of stored grain at a large flow rate and insufficient oxidation of stored grain at a small flow rate.

It is necessary to provide a method for ozone circulation fumigation in grain depot which is used for an equipment for ozone circulation fumigation in grain depot to solve the problem that the existing technology cannot adjust the amount of ozone according to the amount of grain storage, and the overflow of ozone causes ozone waste during circulation.

SUMMARY

The purpose of the invention is to provide an equipment and a method for ozone circulation fumigation in grain depot, which can adjust the amount of ozone entering the grain storage cavity according to the amount of grain storage, and it has the characteristics of flexible, simple, versatile, safe and efficient. When the ozone concentration rises to the target concentration, the circulation treatment can be flexibly applied to grain depots with different amounts of grain storage and different sizes, which is safer and more environmentally friendly than traditional drug treatment.

In order to achieve the above purpose, the invention provides an equipment for ozone circulation fumigation in grain depot, comprising a grain storage cavity, an air intake unit, a circulation unit and a fixed unit, the air intake unit is connected to the grain depot through a fixed unit, and the circulation unit is located on a side of the grain depot away from the air intake unit, the circulation unit is connected to the air intake unit through a reflux pipe, and the reflux pipe is equipped with an ozone concentration sensor.

A transverse diffusion tube of the air intake unit is connected with the grain storage cavity, there is a ventilation partition in the grain storage cavity, there are several air vents on the ventilation partition, and a backflow channel is formed between the ventilation partition and a side wall of the grain depot.

Preferably, a number of installation holes are evenly arranged on the transverse diffusion tube of the air intake unit, a vertical diffusion tube is connected to the transverse diffusion tube through the installation holes, and the vertical diffusion tube is equipped with a number of ventilation holes connected to the grain storage cavity.

Preferably, an ozone generator of the air intake unit is connected to a circulation fan through a first valve, the circulation fan is connected to an air intake pipe through a second valve, and the air intake pipe is connected to the transverse diffusion tube.

Preferably, a negative pressure fan of the circulation unit is located at a top of a grain storage cavity, a negative pressure air intake pipe of the negative pressure fan is connected with a backflow channel, and the negative pres-sure outlet of the negative pressure fan is connected with the circulation fan through a reflux pipe.

Preferably, a fixed frame I of the fixed unit connects the transverse diffusion tube to a ground of the grain depot, the ventilation partition is connected to the side of the grain depot away from the transverse diffusion tube, and the negative pressure fan is connected to a cover plate at the top of the ventilation partition.

Preferably, a backflow channel is connected to the grain storage cavity.

Preferably, a cover plate is equipped with a through hole connected to a third valve, and another end of the third valve is connected to the negative pressure fan, the reflux pipe connected to the negative pressure fan is connected to the top of the grain depot through the fixed frame nd ond the reflux pipe is connected to the circulation fan outside the grain depot.

Preferably, a fourth valve is arranged at an interval on the transverse diffusion tube.

Preferably, there is a sealing film at the top of the grain storage cavity, and there is a slope under the transverse diffusion tube, with a slope angle of 30-60°.

The above method for equipment for ozone circulation fumigation in grain depot comprises the following steps.

S1, opening the ozone generator and the circulation fan, and the ozone enters the transverse diffusion tube through the open first valve and the second valve, and then the ozone enters a grain pile of the grain storage cavity;

S2, starting the negative pressure fan to force the ozone in the grain pile to move in a direction of the ventilation partition, and the ozone enters the backflow channel and returns to the transverse diffusion tube through the circulation fan and the reflux pipe to complete an ozone cycle;

S3, supplementing high concentration ozone by using the ozone generator, improving the ozone concentration in the grain storage cavity, and closing the ozone generator and the first valve after the ozone concentration reaches a standard;

S4, conducting circulating ozone fumigation on the grain pile by the ozone in the grain storage cavity through the circulation unit and the circulation fan, and closing the second valve and the third valve after the completion.

Therefore, the invention adopts the above-mentioned equipment and method for ozone circulation fumigation in grain depot, and its beneficial effects are as follows:

1. The equipment provided by the invention can adjust the amount of ozone entering the grain storage cavity according to the amount of grain storage. When the ozone concentration rises to the target concentration, the circulation treatment is carried out, which can be flexibly applied to grain depots with different amounts of grain storage and different sizes, compared with traditional drug treatment, it is more safe and environmentally friendly;

2. The invention controls the amount of ozone entering the horizontal diffusion tube through the fourth valve, and it can flexibly set the number of air intake unit and circulation unit to accurately put ozone into the grain storage cavity which has been put grain, and it can achieve accurate circulation fumigation for less amount of grain storage;

3. The air intake unit and the circulation unit of the invention are used together to form an independent ozone circulation channel, which can achieve uniform and efficient circulation fumigation for the full load of grain storage.

4. The ozone produced by the invention reacts with the grain pile, which destroys the cell membrane and cell wall of microorganisms, pests and other cells in the grain pile, and causes their death, the circulation fan sends the reacted ozone and the newly generated high-concentration ozone to the grain pile again, through this cycle, the high-concentration ozone is continuously supplemented, and the ozone concentration in the grain depot will gradually increase, when the ozone concentration in the grain depot reaches the target concentration, the ozone generator and the first valve are closed, so that the current concentration of ozone conducts circulation fumigation on the grain pile.

The following is a further detailed description of the technical scheme of the invention through drawings and embodiments.

TAGS OF DIAGRAMS

1, grain depot; 11, grain storage cavity; 12, slope; 13, sealing film; 2. air intake unit; 21, ozone generator; 22, the first valve; 23, circulation fan; 24, the second valve; 25, air intake pipe; 26, transverse diffusion tube; 27, vertical diffusion tube; 28, the fourth valve; 29, air vent; 3, circulation unit; 31, negative pressure fan; 32, backflow channel; 33, cover plate; 34, reflux pipe; 35, the third valve; 36, ventilation partition; 37, air vent; 4. fixed unit; 41, fixed frame age cavity; 12, slope; 13, sealing film;

DETAILED DESCRIPTION OF THE EMBODIMENTS

The technical scheme of the invention is further explained below by drawings and embodiments.

Unless otherwise defined, the technical terms or scientific terms used in the invention should be understood by people with general skills in the field to which the invention belongs. The words 'first', 'second', and the like used in this invention do not represent any order, quantity, or importance, but are only used to distinguish different components. Similar words such as 'include' or 'comprise' mean that the elements or objects appearing before the word cover the elements or objects listed after the word and their equivalents, without excluding other elements or objects. Similar words such as 'connected' or 'linked' are not limited to physical or mechanical connections, but can comprise electrical connection, whether it is direct or indirect. 'Up', 'down', 'left', 'right' and so on are only used to represent the relative positional relationship, when the absolute position of the described object changes, the relative positional relationship may also change accordingly.

Embodiment 1

Figure 1:
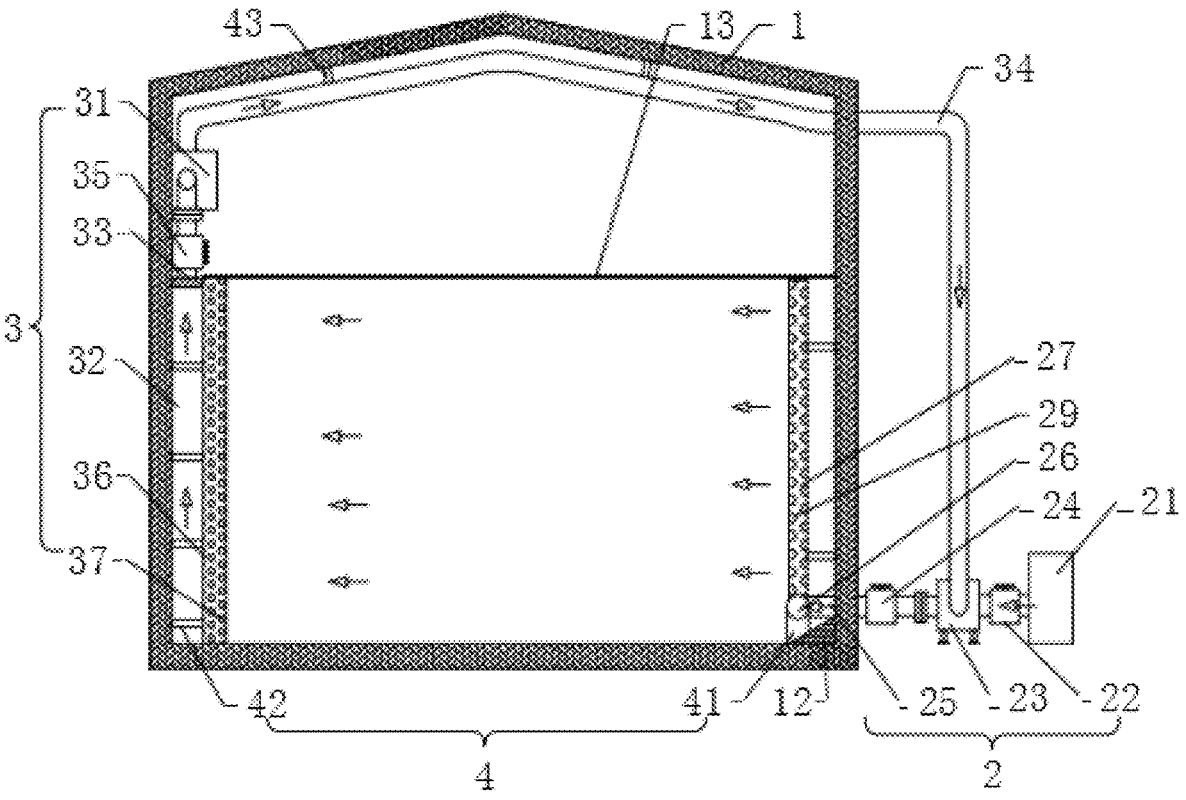
FIG. 1 is the schematic diagram of the equipment for ozone circulation fumigation in grain depot in Embodiment of the invention.
Figure 2:
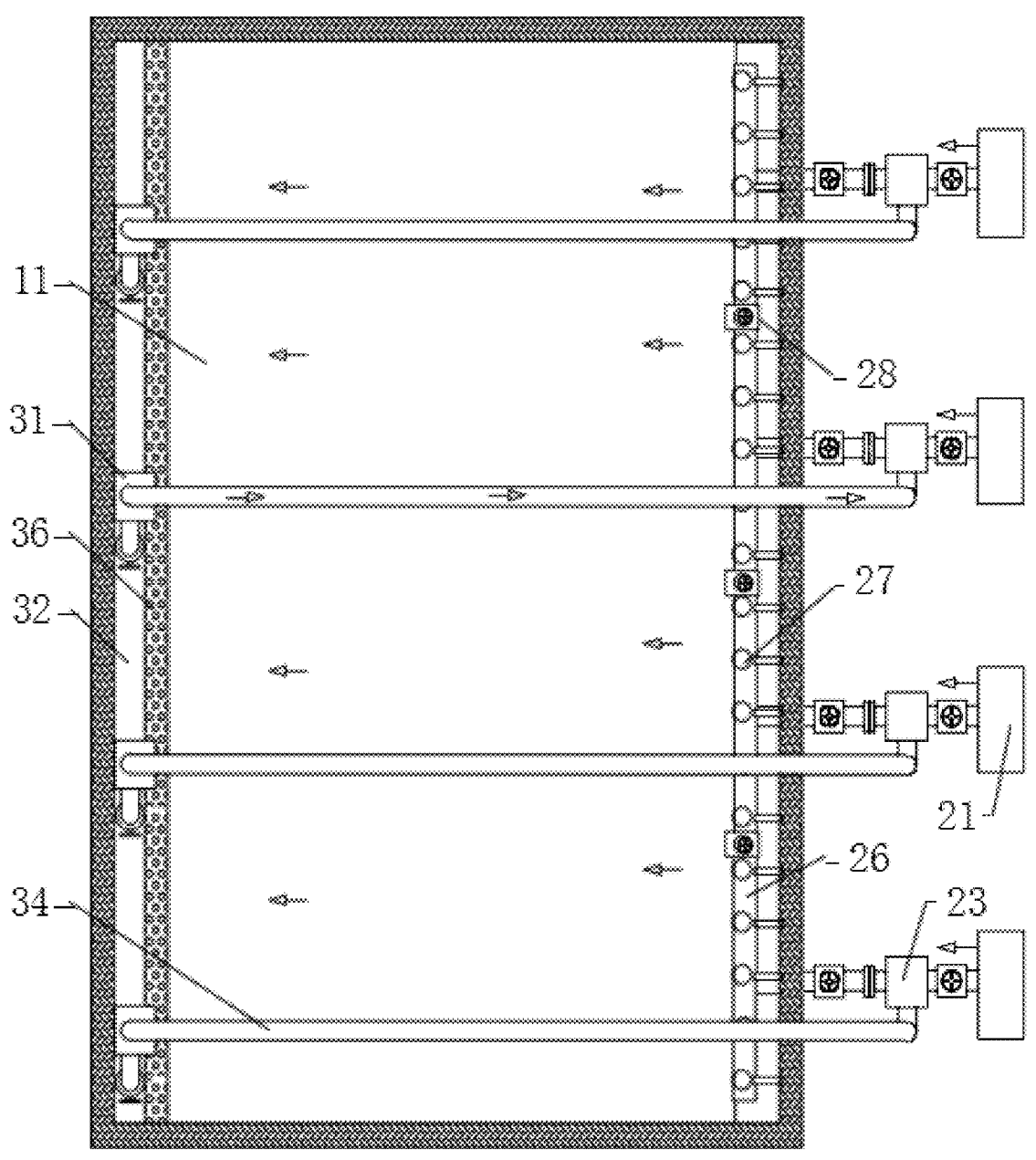
FIG. 2 is a top view of the equipment for ozone circulation fumigation in grain depot in Embodiment 1 of the invention.

The invention provides an equipment for ozone circulation fumigation in grain depot, as shown in FIGS. 1-2, comprising grain storage cavity 11, air intake unit 2, circulation unit 3 and fixed unit 4. The air intake unit 2 is connected with the grain depot 1 through the fixed unit 4, and the circulation unit 3 is located on the side of the grain depot 1 away from the air intake unit 2. The circulation unit 3 is connected to the air intake unit 2 through the reflux pipe 34, and the reflux pipe 34 is equipped with an ozone concentration sensor.

The grain storage cavity 11 is used to store grain, the air intake unit 2 fills ozone into the grain storage cavity 11, and the circulation unit 3 pumps the ozone in the grain storage cavity 11 back to the air intake unit 2 to realize the ozone circulation in the grain storage cavity 11. In this process, ozone reacts with the grain pile, which destroys the cell membrane and cell wall of microorganisms, pests, etc. in the grain pile, causing their death. The circulation fan 23 sends the reacted ozone and the newly generated high-concentration ozone into the grain pile again, through this cycle, high-concentration ozone is continuously supplemented, the ozone concentration in the grain depot 1 will gradually increase.

The ozone concentration sensor detects the ozone concentration, when the ozone concentration reaches the standard, the ozone generator 21 and the first valve 22 are closed. The current concentration of ozone is used to conduct circulation fumigation on the grain pile, after maintaining for a period, the second valve 24 and the third valve 35 are closed, the ozone circulation fumigation has been completed, and the ozone generator 21 and the circulation fan 23 can be selectively unloaded.

The transverse diffusion tube 26 of the air intake unit 2 is connected with the grain storage cavity 11, and the grain storage cavity 11 is equipped with a ventilation partition 36. There are several air vents 37 on the ventilation partition 36, and a backflow channel 32 is formed between the ventilation partition 36 and the side wall of the grain depot 1, and the backflow channel 32 is connected with the grain storage cavity 11. The setting of the ventilation partition 36 prevents the grain from entering the backflow channel 32 through the grain storage cavity 11 with ozone, blocking the circulation fan 23 and the negative pressure fan 31.

Figure 3:
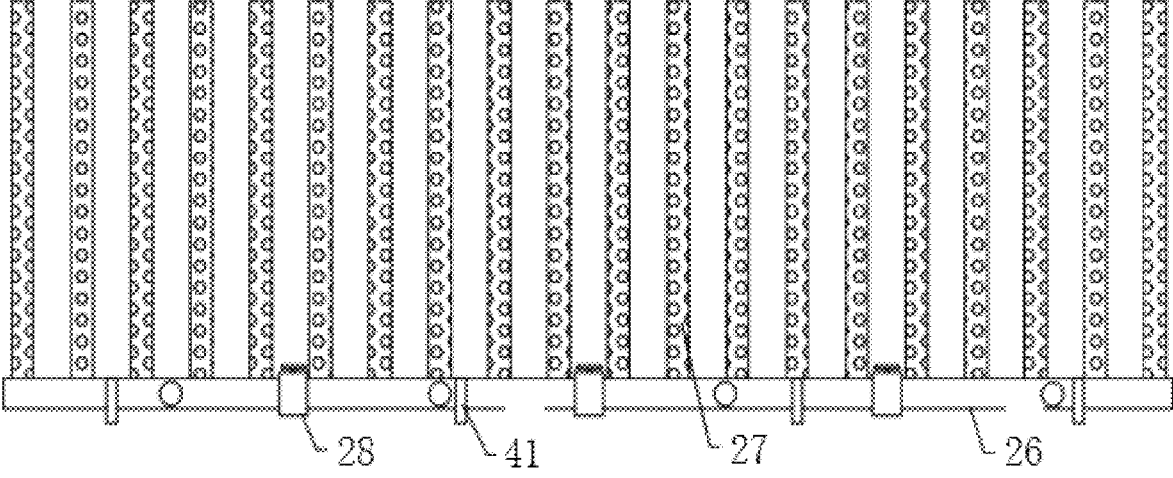
FIG. 3 is the schematic diagram of the air intake unit of the equipment for ozone circulation fumigation in grain depot in Embodiment 1 of the invention.

As shown in FIG. 3, there are several installation holes evenly arranged on the transverse diffusion tube 26 of the air intake unit 2, and a fourth valve 28 is arranged on the transverse diffusion tube 26. The vertical diffusion tube 27 is connected to the horizontal diffusion tube 26 through the installation holes, the vertical diffusion tube 27 has a number of air vents 29 connected to the grain storage cavity 11, and the vertical diffusion tube 27 is set perpendicular to the ground. Ozone enters the horizontal diffusion tube 26 and then enters the vertical diffusion tube 27, and finally enters the grain storage cavity 11 through the air vent 29 of the vertical diffusion tube 27. The setting of the fourth valve 28 controls the position of ozone in the horizontal diffusion tube 26 to avoid the release of ozone from the vertical diffusion tube 27 to the position where the grain is not placed in the grain storage cavity 11.

The ozone generator 21 of the air intake unit 2 is connected to the circulation fan 23 through the first valve 22, the circulation fan 23 is connected to the intake pipe 25 through the second valve 24, and the intake pipe 25 is connected to the transverse diffusion tube 26. The ozone generated by the ozone generator 21 is driven by the circulation fan 23 to enter the horizontal diffusion tube 26 through the air intake pipe 25, and then enter the grain storage cavity 11.

The fixed frame he41 of the fixed unit 4 connects the transverse diffusion tube 26 to the ground of the grain depot 1, the ventilation partition 36 is connected to the side of the grain depot 1 away from the transverse diffusion tube 26, and the negative pressure fan 31 is connected to the cover plate 33 on the top of the ventilation partition 36. The ventilation partition 36 is connected to the side wall of the grain depot 1 through the fixed frame 1 42, and the backflow channel 32 is between the ventilation partition 36 and the side wall of the grain depot 1.

The cover plate 33 is provided with a through hole connected with the third valve 35, and the other end of the third valve 35 is connected with the negative pressure fan 31. The reflux pipe 34 connected with the negative pressure fan 31 is connected with the top of the grain depot 1 through the fixed frame III 43, and the reflux pipe 34 is connected with the circulation fan 23 outside the grain depot 1. The cover plate 33 is set at the top of the backflow channel 32, and its three sides are connected to the side wall of the grain depot 1, and the other side is connected to the ventilation partition 36. There are several through holes on the cover plate 33, and each through hole is connected to a third valve 35.

The top of the grain storage cavity 11 is provided with a sealing film 13, and the setting of the sealing film 13 avoids the ozone in the grain storage cavity 11 overflowing upward to the top of the grain depot 1, resulting in the waste of ozone. There is a slope 12 under the horizontal diffusion tube 26, and the slope 12 angle is 30-60°. The setting of the slope 12 is to facilitate the unloading of grain to the grain storage cavity 11, and it makes the grain between the horizontal diffusion tube 26 and the side wall of the grain depot 1 slide out smoothly and will not be stuck.

The ventilation partition 36 is a multi-layer porous steel plate, and the vertical diffusion tube 27 is a porous network tube, the pore size is less than the maximum diameter of the grain, the reflux pipe 34 is PVC pipe or stainless steel pipe.

In this embodiment, multiple sets of air intake unit 2 and circulation unit 3 are set up, the size of grain depot 1 is 27 m*18 m*6 m, and the grain storage condition is full load. Due to the large amount of grain storage in this embodiment, and in fact, grain depot 1 cannot be completely sealed. If all ozone generators 21 are closed and only ozone circulation is performed, the ozone concentration will gradually decrease, and the reaction time to microorganisms and pests will be reduced, resulting in incomplete Insecticidal sterilization. Therefore, it is necessary to retain the operation of one or two sets of ozone generators 21 to maintain ozone concentration; after a period of ozone circulation, the reserved ozone generator 21 and all the second valves 24 and the third valves 35 are closed, the ozone circulation fumigation has been completed, and the ozone generator 21 and the circulation fan 23 can be selectively unloaded.

Embodiment 2

Figure 4:
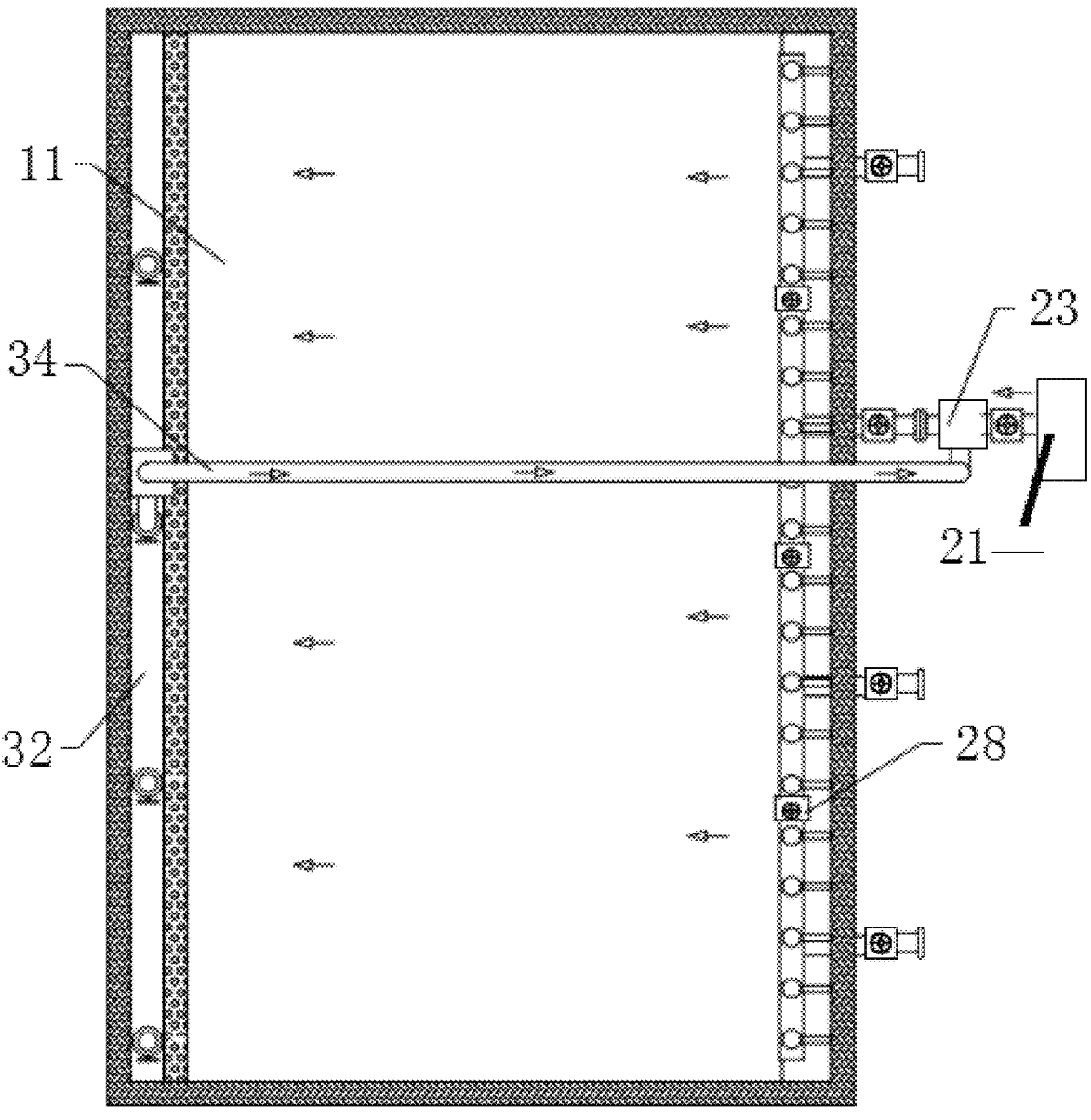
FIG. 4 is the schematic diagram of the equipment for ozone circulation fumigation in grain depot in Embodiment 2 of the invention.

As shown in FIG. 4, the difference between Embodiment 2 and Embodiment 1 is that there is only one group of circulation unit 3 and air intake unit 2, the rest is the same as the Embodiment 1, which can be used to place a small amount of grain. The fourth valve 28 is closed at the place where the grain is not placed, ozone will not diffuse to the entire horizontal diffusion tube 26, and it will only diffuse to the vertical diffusion tube 27 at the location of the grain pile. Then, the air vent 29 on the vertical diffusion tube 27 flows into the grain pile, and the corresponding negative pressure fan 31 carries out pumping treatment on the backflow channel 32, forcing the ozone to flow from the 27 side of the vertical diffusion tube to the side of the ventilation partition 36.

Embodiment 3

Using the method for the equipment of ozone circulation fumigation in grain depot in Embodiment 1 or Embodiment 2, comprising the following steps, S1, opening the ozone generator and the circulation fan, and the ozone enters the transverse diffusion tube through the open first valve and the second valve, and then the ozone enters a grain pile of the grain storage cavity;

S2, starting the negative pressure fan to force the ozone in the grain pile to move in a direction of the ventilation partition, and the ozone enters the backflow channel and returns to the transverse diffusion tube through the circulation fan and the reflux pipe to complete an ozone cycle;

S3, supplementing high concentration ozone by using the ozone generator, improving the ozone concentration in the grain storage cavity, and closing the ozone generator and the first valve after the ozone concentration reaches a standard;

S4, conducting circulating ozone fumigation on the grain pile by the ozone in the grain storage cavity through the circulation unit and the circulation fan, and closing the second valve and the third valve after the completion.

Therefore, the invention adopts an equipment and a method for ozone circulation fumigation in grain depot with the above structure, the generated ozone reacts with the grain pile, which destroys the cell membrane and cell wall of microorganisms and pests in the grain pile, and causes their death, the circulation fan sends the reacted ozone and the newly generated high-concentration ozone into the grain pile again, through this cycle, the high-concentration ozone is constantly supplemented, and the ozone concentration in the grain depot will gradually increase, when the ozone concentration in the grain depot reaches the target concentration, the ozone generator and the first valve are closed, so that the current concentration of ozone can conduct circulation fumigation the grain pile.

Finally, it should be explained that the above embodiments are only used to explain the technical scheme of the invention rather than restrict it, although the invention is described in detail with reference to the better embodiment, the ordinary technical personnel in this field should understand that they can still modify or replace the technical scheme of the invention, and these modifications or equivalent substitutions cannot make the modified technical scheme out of the spirit and scope of the technical scheme of the invention.

What is claimed is:

1. An equipment for ozone circulation fumigation in a grain depot, comprising a grain storage cavity, an air intake unit, a circulation unit, and a fixed unit, wherein the air intake unit is connected to the grain depot through the fixed unit, the circulation unit is located on a side of the grain depot away from the air intake unit, the circulation unit is connected to the air intake unit through a reflux pipe, and the reflux pipe is equipped with an ozone concentration sensor;

a transverse diffusion tube of the air intake unit is connected with the grain storage cavity, a ventilation partition is provided in the grain storage cavity, a plurality of air vents are provided on the ventilation partition, and a backflow channel is formed between the ventilation partition and a side wall of the grain depot;

a top of the grain storage cavity is equipped with a sealing film to avoid ozone in the grain storage cavity overflowing upward to a top of the grain depot, resulting in a waste of the ozone;

a plurality of installation holes are evenly arranged on the transverse diffusion tube of the air intake unit, a vertical diffusion tube is connected to the transverse diffusion tube through the plurality of installation holes, and the vertical diffusion tube is equipped with a plurality of ventilation holes connected to the grain storage cavity;

the ventilation partition is a multi-layer porous steel plate, and the vertical diffusion tube is a porous network tube;

an ozone generator of the air intake unit is connected to a circulation fan through a first valve, the circulation fan is connected to an air intake pipe through a second valve, and the air intake pipe is connected to the transverse diffusion tube;

a negative pressure fan of the circulation unit is located at the top of the grain storage cavity, a negative pressure air intake pipe of the negative pressure fan is connected with the backflow channel through a third valve, and a negative pressure outlet of the negative pressure fan is connected with the circulation fan through the reflux pipe;

the backflow channel is connected to the grain storage cavity; and a fourth valve is arranged at intervals on the transverse diffusion tube.

2. The equipment for the ozone circulation fumigation in the grain depot according to claim 1, wherein a first fixed frame of the fixed unit connects the transverse diffusion tube to a ground of the grain depot, the ventilation partition is connected to a side of the grain depot away from the transverse diffusion tube, and the negative pressure fan is connected to a cover plate at a top of the ventilation partition.

3. The equipment for the ozone circulation fumigation in the grain depot according to claim 2, wherein the cover plate is equipped with a through hole connected to a first end of the third valve, and a second end of the third valve is connected to the negative pressure fan, the reflux pipe connected to the negative pressure fan is connected to the top of the grain depot through a third fixed frame, and the reflux pipe is connected to the circulation fan outside the grain depot.

4. The equipment for the ozone circulation fumigation in the grain depot according to claim 1, wherein a slope is arranged under the transverse diffusion tube with a slope angle of 30-60°.

5. A method of using the equipment for the ozone circulation fumigation in the grain depot according to claim 1, comprising:

S1, opening the ozone generator and the circulation fan, wherein ozone enters the transverse diffusion tube through the first valve and the second valve, and then the ozone enters a grain pile of the grain storage cavity;

S2, starting the negative pressure fan to force the ozone in the grain pile to move in a direction of the ventilation partition, wherein the ozone enters the backflow channel and returns to the transverse diffusion tube through the circulation fan and the reflux pipe to complete an ozone cycle;

S3, supplementing high concentration ozone by using the ozone generator, improving an ozone concentration in the grain storage cavity, and closing the ozone generator and the first valve after the ozone concentration reaches a standard;

S4, conducting circulating ozone fumigation on the grain pile by the ozone in the grain storage cavity through the circulation unit and the circulation fan, and closing the second valve and the third valve after a completion.

* * * * *